UNITED STATES PATENT OFFICE.

EMIL EHRENSBERGER, OF ESSEN, GERMANY, ASSIGNOR TO FRIED. KRUPP, OF SAME PLACE.

PROCESS OF HARDENING AND TOUGHENING ARMOR-PLATES.

SPECIFICATION forming part of Letters Patent No. 651,965, dated June 19, 1900.

Application filed April 21, 1896. Serial No. 588,513. (No specimens.)

*To all whom it may concern:*

Be it known that I, EMIL EHRENSBERGER, a subject of the King of Prussia, Emperor of Germany, and a resident of Essen, in the Kingdom of Prussia, German Empire, have invented new and useful Improvements in Processes of Hardening and Toughening Armor-Plates, of which the following is a full, clear, and exact description.

The method or process forming the subject of the present invention has for its object the improvement of steel armor-plates by imparting to the side thereof which is exposed to the impact of projectiles the greatest suitable hardness and to the other side thereof the greatest toughness which the armor-plate material can acquire. By such construction and the mode of manufacture hereinafter described is obtained the greatest resistance to cracking and the highest degree of strength.

After steel armor-plates have been improved in quality by being suddenly cooled down from a high temperature that renders the molecules capable of an easy rearrangement they may be made to acquire the quality of extreme toughness by being heated a second time to a lower temperature than the first heating and by being allowed to cool slowly down from said temperature. These respective high temperatures will vary with the nature and composition of the steel, and hence directions cannot be given in exact degrees of temperature; but the first heating should be of such high degree as will permit easy flow or rearrangement of the molecules, and this may be obtained by heating up to about, say, 800° to 1,000° centigrade, but should stop short of the melting-point; but in order that the armor-plate shall combine the most efficient degree of hardness of one side and the greatest degree of toughness of the other side I treat the plate in the following manner: The plate is first improved in quality by being heated, as above described, to the high temperature which permits an easy or ready flow or rearrangement of the molecules, and the entire plate is then suddenly cooled from such temperature by immersion or spraying in the usual manner. I call this the "quality-improving" heat. By this means the steel acquires not only considerable hardness, but also an extreme fineness of grain or texture which makes it capable of subsequently acquiring the greatest degree of toughness; but as the hardness is now too great to allow of machining or shaping the plate the temper should be then drawn and the plate be then machined or shaped as may be desired, or the plate is heated to a temperature at which hardening will not take place and the plate is then cooled suddenly from this temperature. Then the plate can be machined or shaped while cold. This heat I call the "tempering" heat. The plate having been thus properly worked, one side— viz., the side intended to be exposed to the impact of projectiles—is heated to a temperature adapted to produce the required degree of hardness. This I call the "hardening" heat, and the other or rear side is heated to a temperature below that to which the exposed side is heated. This latter temperature should be such as to produce toughness in the highest degree and will be a red heat. This I call the "toughening" heat. The plate is then suddenly cooled either by immersion or spraying.

The heating of the two sides is preferably effected for practical reasons at one and the same time by bringing those parts which are to be more intensely heated rapidly to the said higher temperature, while those parts which are not to be heated so intensely are either embedded in sand or placed upon a rather cool hearth, and thus withdrawn from the direct or full action of the furnace, or they may be placed on a hollow frame and kept at the suitable lower temperature by means of cooling-gases introduced into such hollow frame, or, less practically but productive of the same result, the more intense heating of the surface to be hardened and the sudden cooling thereof may be caused to follow on or it may precede the heating of the other side to the lower temperature and the sudden cooling thereof.

It will be understood that this process is suitable for armor-plates of homogeneous steel and alloys of steel—such as chrome-steel, wolfram steel, nickel-steel, chrome-nickel steel, &c.—as well as for cemented, compound, and other plates. In the case of cemented plates the first quality-improving heat may be dispensed with, because the heating necessary for the cementing process may be utilized at the same time for the operation of improving the grain or texture. Moreover, in cases in which the alteration or distortion of shape, produced by the quality-improving heat required for the improvement of the grain or texture, is not important the tempering heat, which would be otherwise necessary for the shaping and machining operations and which is interposed between the quality-improving heat and the hardening and toughening heat, (which heats are of different temperatures,) may be dispensed with, because the shaping of the plates may in such case be effected previously thereto; but if this tempering heat has been effected and if the operation was such as to impart the required maximum toughness to the back of the plate any desired temperature may be employed in the subsequent treatment which does not exceed the temperature of the tempering heat.

In conclusion it may be stated that the herein-described operation which precedes the actually novel part of the process—that is to say, the first operation for the purpose of improving the grain or texture of the material and also the second operation for facilitating the machining and shaping of the material—may be replaced by similar or equivalent treatments without altering the essential nature of the process. For instance, the plates to be hardened on one side only may have imparted to them a suitable grain or texture by being rolled at a low temperature before their parts are differently heated.

What I claim as new is—

1. The herein-described process for imparting special hardness to one side and maximum toughness to the other side of plates made of steel or mixtures of steel capable of being hardened, consisting in heating the side which is to be hardened to a temperature corresponding to the degree of hardness desired, heating the other side which is to become tough to a temperature lower than that necessary to produce hardening, and suddenly cooling the plate from the different temperatures.

2. The herein-described process for imparting special hardness to one side and maximum toughness to the other side of plates made of steel or mixtures of steel capable of being hardened, consisting in first subjecting the plate to a high temperature permitting an easy molecular rearrangement, then suddenly cooling the plate, then heating the side which is to be hardened to a temperature corresponding to the degree of hardness desired, while heating the other side, which is to become tough, to a lower heat, and below that necessary to produce hardening, and then suddenly cooling the plate from the different temperatures.

3. The herein-described process for imparting special hardness to one side and maximum toughness to the other side of plates made of steel or mixtures of steel capable of being hardened, consisting in first subjecting the plate to a high temperature permitting an easy molecular rearrangement, then suddenly cooling the plate, then heating the plate to a low heat, not high enough to produce hardening, then suddenly or slowly cooling and shaping the plate after cooling; then reheating the side of the plate which is to be hardened to a temperature corresponding to the degree of hardness desired, while heating the other side, which is to become tough, to a red heat below that necessary to produce hardening, and then suddenly cooling the plate from the different temperatures.

In testimony whereof I have signed my name to this specification in the presence of two subscribing witnesses.

EMIL EHRENSBERGER.

Witnesses:
WILLIAM ESSENWEIN,
FRITZ ARTHOWEYR.